United States Patent [19]

Hunzinger

[11] Patent Number: 5,169,178
[45] Date of Patent: Dec. 8, 1992

[54] FITTING FOR USE IN A HEAT EXCHANGE SYSTEM

[75] Inventor: Thomas A. Hunzinger, Racine, Wis.

[73] Assignee: Modine Manufacturing Co., Racine, Wis.

[21] Appl. No.: 538,247

[22] Filed: Jun. 14, 1990

[51] Int. Cl.⁵ .............................................. F16L 3/00
[52] U.S. Cl. ........................................ 285/26; 285/62; 285/137.1; 285/158; 285/287; 165/76; 403/254; 62/299
[58] Field of Search ........................ 285/25, 26, 29, 61, 285/62, 137.1, 158, 161, 287, 64, 63, 158, 189, 28; 403/254, 261, 243, 253, 257; 248/56, 68.1, 69, 74.2; 165/76, 78, 79, 80.1; 62/295, 297, 299

[56] References Cited

U.S. PATENT DOCUMENTS

| | | | |
|---|---|---|---|
| 1,650,573 | 11/1927 | Searles | 403/261 X |
| 1,659,094 | 2/1428 | Godfrey | 258/158 X |
| 2,540,649 | 2/1951 | Boylan | 62/299 |
| 3,092,360 | 2/1962 | Cook et al. | 285/158 X |
| 3,758,138 | 9/1973 | Roseman | 285/137.1 |
| 3,879,068 | 4/1975 | Stampfli | 285/137.1 |
| 3,905,789 | 9/1975 | Carpenter | 62/299 |
| 3,944,264 | 3/1976 | Mona et al. | 285/137.1 |
| 4,249,353 | 2/1981 | Berry | 285/189 |
| 4,431,043 | 2/1984 | Goodell et al. | 285/190 |
| 4,601,448 | 7/1986 | Miyazaki et al. | 285/61 |
| 4,615,546 | 10/1986 | Nash et al. | 285/26 |
| 4,682,472 | 7/1987 | Huard | 165/76 X |
| 4,765,658 | 8/1988 | Reche | 285/921 |

FOREIGN PATENT DOCUMENTS 619078  3/1949  United Kingdom ................. 403/261

*Primary Examiner*—Randolph A. Reese
*Assistant Examiner*—Timothy Aberle
*Attorney, Agent, or Firm*—Wood, Phillips, VanSanten, Hoffman & Ertel

[57] ABSTRACT

Difficulties in brazing or welding a fitting that may be utilized in a heat exchange system are avoided in a construction that includes a mounting block (100) including a formation (102) by which the block (100) may be mounted on another object such as a support (10). At least one aperture (108, 110) extends through the block (100) at a sleeve (112, 114), having opposed ends (122, 128; 158, 160) and an exterior surface (131, 155) sized to snuggly and slidably pass at least partially through the aperture (108, 110) and an interior surface (126, 150) defining a fluid passage. A pair of axially spaced grooves (140, 142; 152, 154) are in the exterior surface (131, 155) and are spaced a distance about equal to the thickness of the block (100) at the apertures (108, 110). A retaining ring (176, 178) may be located in one of the grooves (140, 152) and a retaining clip (170) is removably received in the other groove (142, 154) remote therefrom. As a consequence, the sleeve (112, 114) may be joined to tubing (34, 38) in a heat exchange system without subjecting the mounting block (100) to the bonding procedure.

16 Claims, 3 Drawing Sheets

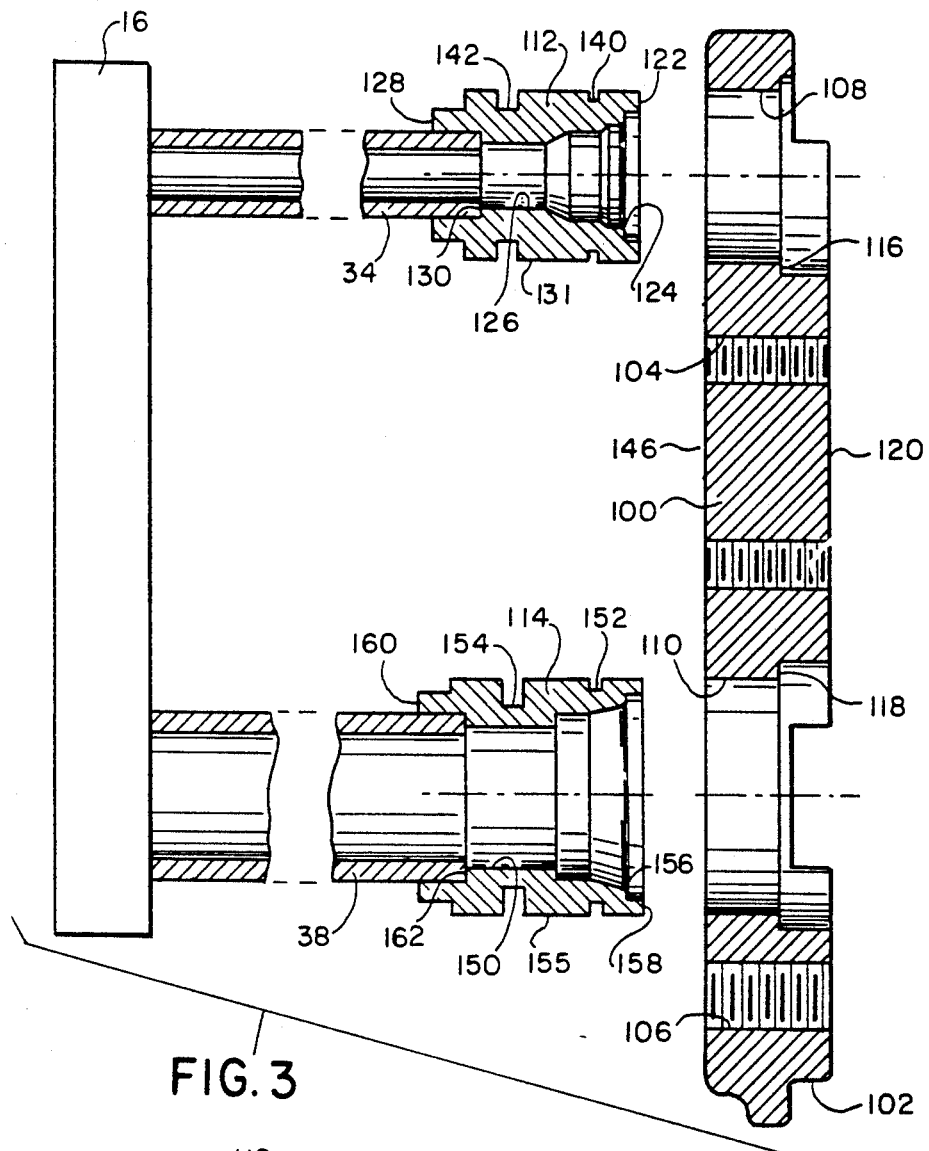
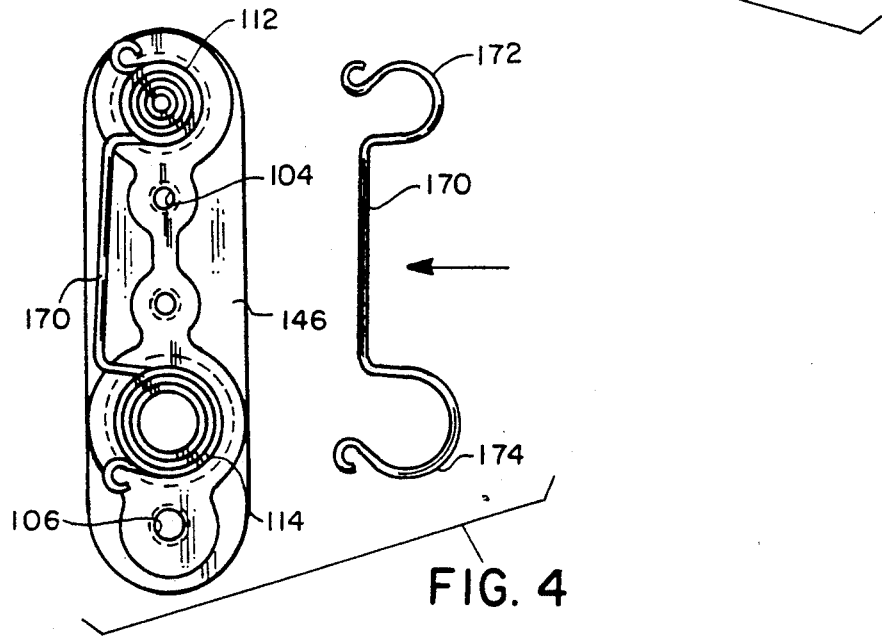
FIG. 3
FIG. 4

FITTING FOR USE IN A HEAT EXCHANGE SYSTEM

FIELD OF THE INVENTION

This invention relates to a fitting for use in a heat exchange system, and more particularly, to a fitting assembly that may be advantageously employed in an automotive air conditioning system.

BACKGROUND OF THE INVENTION

Many heat exchange systems, as, for example, refrigeration or air conditioning systems, have components that are subject to relatively high internal pressures. As a consequence, high strength bonding methods are employed to bond components together. Brazing is a frequent technique and, as is well-known, the components to be bonded together are assembled, frequently with the aid of a fixture or jig, and then passed into a brazing oven or the like. Welding is also employed.

Within the brazing oven, the components are raised to specific temperatures for such periods of time as to effect a change of state in the braze metal while the base metal remains essentially solid to cause a brazed joint to be formed. While this technique is very satisfactory for its intended purpose, and indeed, has been employed successfully for scores of years, it is not without its potential pitfalls.

In order to get an ideal brazed bond, it is necessary that all parts be raised to a temperature above the melting point of the braze metal and yet below the melting point of the base metal; and that there be a substantial uniformity of temperature in the assembly being brazed. Where time is not of great concern, this may be relatively easy to achieve since temperature equilibrium throughout the assembly to be brazed will eventually occur over a prolonged period of time. However, in modern manufacturing techniques, it is generally desirable to minimize a length of time required for the performance of any given operation to improve efficiency of the process. Consequently, in modern brazing processes, it is desired to minimize the residence time within the brazing oven.

Furthermore, even though the base metal may not have its temperature increased to a point above its melting point, the temperature to which it is elevated during the brazing process may be sufficiently close that prolonged exposure thereto may result in sagging of the components if they are not supported appropriately within fixtures. And appropriate support may necessitate the use of unduly complicated fixtures. Welding processes have similar potential problems.

One area in which the foregoing presents a problem is in the field of automotive air conditioners. As illustrated in FIG. 1, wherein a prior art system is illustrated schematically, a vehicle may have a fire wall 10. On one side of the fire wall 10 is a passenger compartment 12 while on the opposite side is the engine compartment 14.

An evaporator shown schematically at 16 will typically be located within the passenger compartment 12 while a compressor 18, driven by the engine will be in the engine compartment 14. In the usual case, the compressor is connected to a condenser 20 located forwardly of the engine. Other components such as fans, expansion valves, belts, controls and the like have been omitted for clarity.

In any event, to provide an operative system, it is necessary to connect to the outlet of the condenser 20 to the inlet 24 of the evaporator 16 through the fire wall 10 via a relatively small diameter liquid refrigerant or condensate conduit 26. The outlet 28 of the evaporator is connected through the fire wall 10 to the inlet 30 of the compressor via a relatively large refrigerant vapor conduit 32.

To facilitate installation within the automobile, the liquid refrigerant conduit 26 is made in two segments 34 and 36. Similarly, the refrigerant vapor conduit is made in two segments 38 and 40. The segments 34 and 38 are on the passenger compartment side of the fire wall 10 while the segments 36 and 40 are on the engine compartment side of the fire wall.

A mounting block or fixture 42 may be secured to the fire wall 10 in an opening therein and receives the ends of the conduit segments 34 and 38 which are brazed or welded to interior ports therein. The conduit segments 36 and 40 terminate in respective block fittings 46 and 48 which are secured as by bolts 50 to the block 42 to establish fluid communication and a sealed relation between the segments 34 and 36 on the one hand and the segments 38 40 on the other.

Typically, the various components are bonded together as by welding or brazing. The difference in mass between the block 42 and the other components of this system can give rise to the previously mentioned problems during a welding or brazing operation.

The present invention is directed to provision of a fitting that avoids such difficulty and yet maintains the same ease of assembly of the components within, for example, an automotive air conditioning system.

SUMMARY OF THE INVENTION

It is the principal object of the invention to provide a new and improved fitting for use in a heat exchange system. More specifically, it is an object of the invention to provide such an assembly for use in a brazed or welded heat exchange system.

According to the invention, there is provided a mounting block including a formation by which the block may be mounted on another object such as a support. At least one aperture extends through the block and a sleeve having opposed ends and an exterior surface sized to snuggly and slidably pass at least partially through the aperture is provided. The sleeve also has an interior surface defining a fluid passage.

A pair of axially spaced grooves are located in the exterior surface of the sleeve and the grooves are spaced a distance about equal to the thickness of the block at the aperture. The interior passage of the sleeve, at one of the ends thereof, includes a seat for sealing abutment with a male coupling and retaining means are received in the grooves to mount the sleeve to the mounting block.

By brazing the sleeve to a tube of a heat exchanger and thereafter assembling the sleeve while connected to the heat exchanger to the mounting block, the subjection of the mounting block to a brazing or welding operation is avoided and the problems associated therewith are likewise avoided.

In a preferred embodiment, a retaining ring is located in the groove nearest the end having the seat and abuts one side of the block while a retaining means is removably received in the other groove and abuts the other side of the block.

According to the invention, one side of the block includes a recess about the aperture and has a depth and a periphery sized to receive the retaining ring and hold the same in the groove in which it is received.

The invention contemplates that the interior surface at the end of the sleeve opposite the retaining ring be cylindrical for receipt of a tube and include an interior shoulder for limiting the introduction of a tube into such end.

In a highly preferred embodiment, the retaining means are resilient.

In a highly preferred embodiment, there are two such sleeves and two such apertures in the mounting block. According to this embodiment, one of the retaining means may be a single element received in a groove in both of the sleeves.

In a highly preferred embodiment of the invention, the single element is a spring retainer having first and second U-shaped formations for respective seating in the grooves of the first and second sleeves respectively. A resilient wire may be utilized for the purpose.

The retaining rings may be individual C-shaped retaining rings.

The mounting block may include spaced, male coupling mounting means which preferably are in the form of threaded bores.

One side of the mounting block may be provided with a relief, which is adapted to locate the block in an opening. Preferably, the relief is a peripheral relief.

Other objects and advantages will become apparent from the following specification taken in connection with the accompanying drawings.

DESCRIPTION OF THE DRAWINGS

FIG. 3 is a fragmentary, exploded, sectional view of a fitting made according to the invention;

FIG. 4 is a view from the left of FIG. 3, omitting the showing of the evaporator, but additionally illustrating a retainer;

DESCRIPTION OF THE PREFERRED EMBODIMENT

Figure 2:
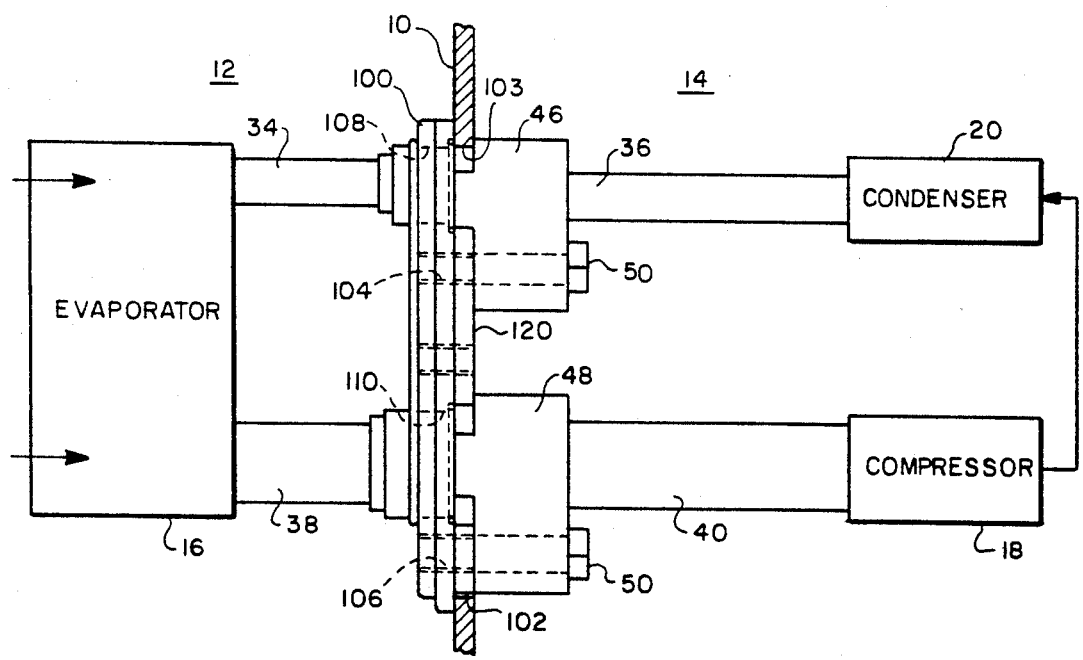
FIG. 2 is a view similar to FIG. 1, but of a system made according to the invention.

An exemplary embodiment of a heat exchange system in which a fitting made according to the invention may be utilized is illustrated in FIG. 2. It will be immediately appreciated that certain of the components therein shown are found in the prior art system already described and in the interest of brevity, will be given the same reference numeral and not re-described. Such components include the fire wall 10, the passenger compartment 12, the engine compartment 14, an evaporator 16, a compressor 18, a condenser 20, a condensator liquid refrigerant line made up of segments 34 and 36 and a refrigerant vapor line made up of segments 38 and 40. Also employed are block fittings 46 and 48 on the engine compartment side along with bolts 50.

According to the invention, a mounting block 100 includes a peripheral relief 102 (FIGS. 2 and 5) on one side thereof for receipt within a somewhat oval shaped opening 103 within the fire wall 10. At least two threaded bores 104 and 106 are provided in spaced location for receipt of the bolts 50 associated with the blocks 46 and 48. Adjacent each of the threaded bores 104 and 106 is a respective stepped aperture 108 and 110. As can be seen in FIG. 3, the aperture 110 is somewhat larger than the aperture 108 when in either event, the two are sized to receive respective sleeves 112 and 114 in a snug, slidable fashion so that the same may pass at least partially through the respective aperture 108 and 110.

Because the apertures 108 and 110 are stepped as mentioned previously, they include an internal shoulder 116 and 118, respectively, that faces to the side 120 of the mounting block 100 that is received within the opening 103 and the fire wall 10.

Within one end 122 of the sleeve 112, there is a convex seat 124 which may have any of a variety of known configurations adapted to seal with a male coupling element carried by the block 46. The seat 124 is generally convex about an interior fluid passage 126 which extends from the end 122 of the sleeve 112 to the opposite end 128 thereof. Near the end 128, an internal shoulder 130 is provided. The interior of the end 128 is cylindrical and adapted to receive an end of the condensate segment 34 and the shoulder 130 is intended to limit the penetration of the condensate segment into the sleeve 112.

On its external surface 131, the sleeve 112 includes a relatively narrow and shallow groove 140 near the end 122. Near the end 128, a deeper and wider groove 142 is provided. It is to be noted that the spacing between the grooves 140 and 142 is approximately equal to the thickness of the mounting block 100 at the aperture 108. That is to say, the spacing between the grooves 140 and 142 is equal to or just slightly greater than the distance between a side 146 of the mounting block opposite the side 120 and the shoulder 116.

The sleeve 114 is generally identical to the sleeve 112 save for a larger exterior diameter as well as a larger internal passage 150 because it is employed on the vapor side of the system. It includes exterior grooves 152 and 154 on an exterior surface 155 and spaced as aforesaid along with a convex internal seat 156 near an end 158. The opposite end 160 includes an internal shoulder 162 for limiting penetration of an end of the vapor segment 38.

Figure 5:
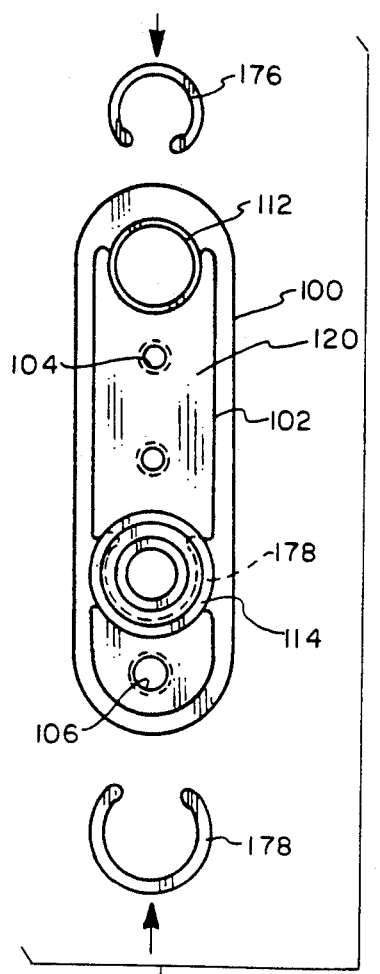
FIG. 5 is a view similar to FIG. 4, but from the right of FIG. 3.

Other components employed are illustrated in FIGS. 4 and 5. Looking first at FIG. 4, a resilient wire is formed into a retaining clip 170 having spaced, U-shaped formations 172 and 174 at its opposite ends. The U-shaped formations 172 and 174 are sized to be received on the sleeves 112 and 114, respectively, and specifically, in the grooves 142 and 154 thereof.

As seen in FIG. 5, two C-shaped resilient retaining rings 176 and 178 are provided and may be received on the sleeves 112 and 114 respectively, and specifically, in the grooves 140 and 152.

During the manufacturing process, the tube segments 34 and 38 have the sleeves 112 and 114 mounted thereon and are subjected to a brazing operation or a welding operation along with the evaporator 116 to which they are attached. By means of a suitable jig or fixture, the sleeves 112 and 114 are located so as to be spaced the same distance as the apertures 108 and 110 in the mounting block 100.

The mounting block 100 is not, itself, subject to a brazing or welding operation.

Figure 6:
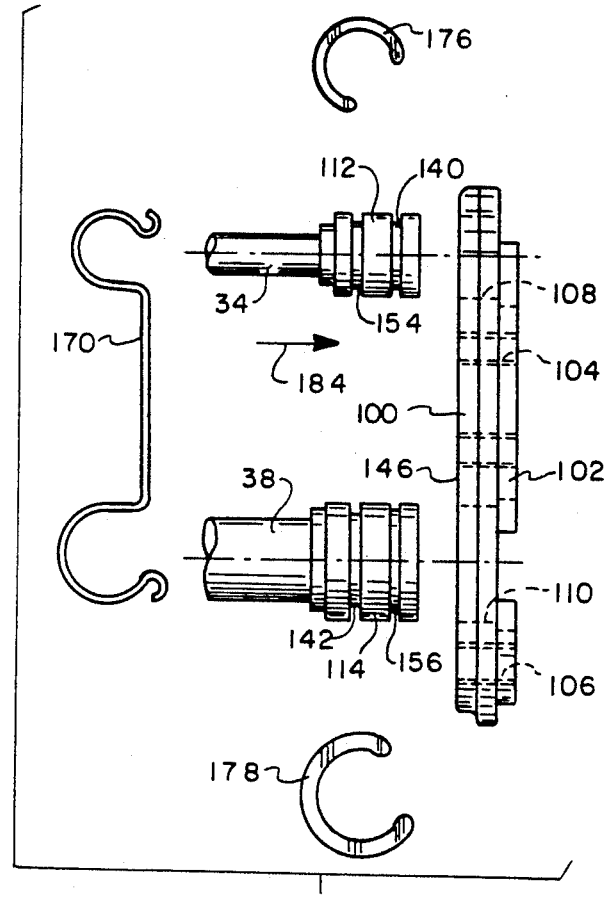
FIG. 6 is an exploded view of various components used with the fitting.
Figure 7:
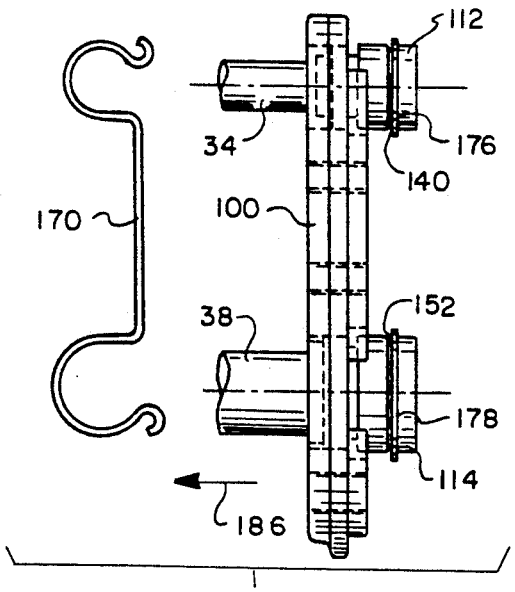
FIG. 7 is an exploded view, but with certain of the components partially assembled.
Figure 8:
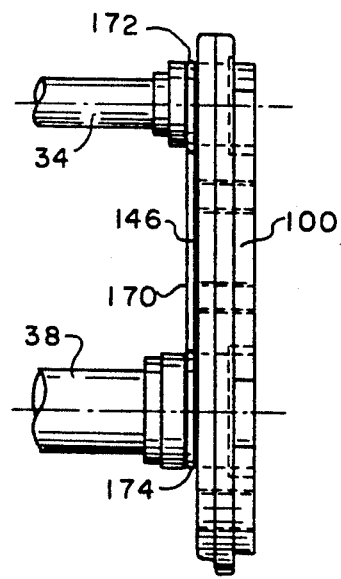
FIG. 8 is a view similar to FIGS. 6 and 7, but with all of the components of the fitting assembled.

After the welding or brazing operation has been completed, the components may be arranged generally as illustrated in FIG. 6, for example, and the evaporator (not shown) advanced to the right of the direction of an arrow 184. As a consequence, the fittings 112 and 114 will enter the apertures 108 and 110 respectively. Movement will continue until the fittings 112 and 114 have passed sufficiently through the apertures 108 and 110 so that the C-shaped retaining rings 176 and 178 may be applied to the grooves 140 and 152 as seen in FIG. 7. Once the retaining rings 176 and 178 have been applied, the evaporator (not shown) may be moved to the left as viewed in FIG. 7 in the direction of an arrow 186. This will result in the rings 176 and 178 bottoming out against the respective shoulders 116 and 118, respectively, in the block 100. At the same time, the grooves 142 and 154 will now be exposed on the side 146 of the mounting block 100 so that they may receive a respective U-shaped formation 172 and 174 of the retaining clip 170.

At this point, the retaining rings 176 and 178 will be abutting the shoulders 116 and 118 on the side 120 of the mounting block while the retaining clip 170 will be abutting the opposite side 146 of the retaining block. The overall result will be to mount the sleeves 112 and 114 to the mounting block 100 with sufficient security as to match the prior art structure, but without suffering the ill effects of going through a brazing operation with the mass of the mounting block 100 as part of the heating operation being performed.

The resulting assembly may then be disposed in the passenger compartment 12 such as illustrated in FIG. 2, such that the mounting block 100 is disposed in the opening 103. The blocks 46 and 48 may then be applied and the bolts 50 tightened to assemble the various components together in sealed relation.

Figure 1:
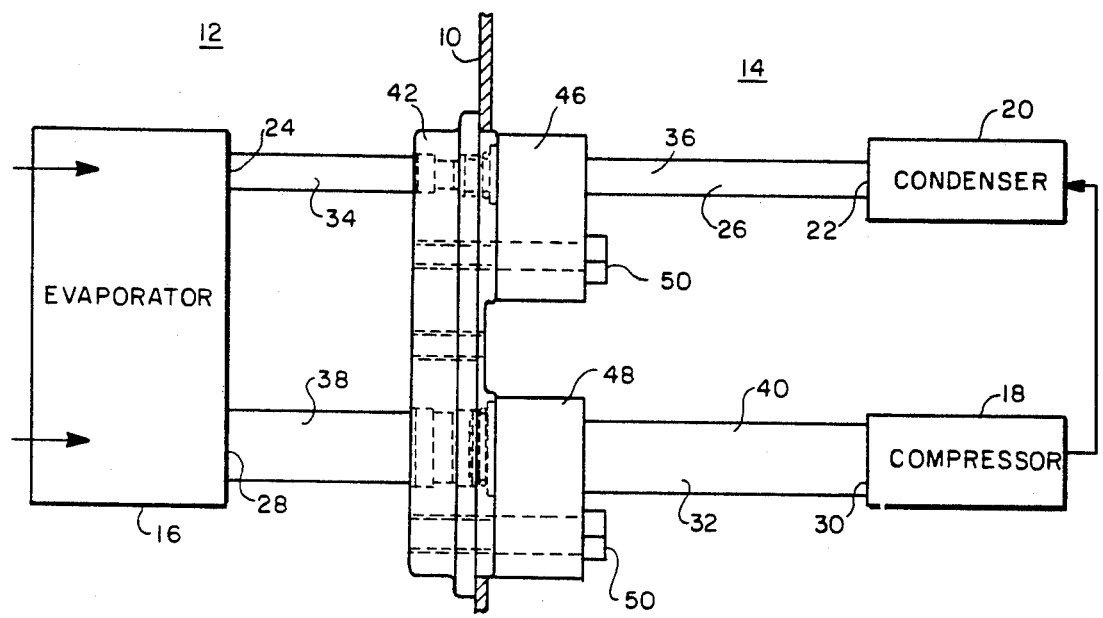
FIG. 1 is a somewhat schematic, elevational view of a heat exchange system made according to the prior art as described previously.

It will thus be appreciate that use of a fitting made according to the invention allows assembly of the components into a heat exchange system within, for example, an automobile with equal facility to the prior art assembly. At the same time, difficulties caused in a welding or brazing process utilized in fabrication of certain of the components are avoided since only the relatively low mass sleeves 112 and 114 are involved as opposed to a relatively high mass prior art mounting block 42 (FIG. 1).

I claim:

1. An assembly for use in an automotive air conditioning system comprising:
 a mounting block adapted to be mounted to a vehicular fire wall separating an engine compartment from a passenger compartment;
 first and second spaced apertures in said block;
 first and second sleeves each having an outer surface sized to be snuggly, but slidably received in a respective one of said apertures, each outer surface having peripheral grooves spaced apart a distance about or just slightly greater than the thickness of said mounting block about the corresponding aperture, each sleeve, at one end having an interior sized to receive a tube to be bonded thereto and at the opposite end including a female seat for receipt of a male coupling element, said first and second sleeves being located in said first and second apertures, respectively;
 first and second retainers, one for each of said sleeves and located in the groove of the associated sleeve nearest said opposite end and abutting one side of said block; and
 retaining means on the other side of said block and abutting the same, said retaining means being located in the grooves of each sleeve nearest said one end.

2. The assembly of claim 1 wherein said retaining means is a single element received in a groove in each of said sleeves.

3. The assembly of claim 2 wherein said single element is a spring retainer having first and second U-shaped formations for respective seating in the grooves of said first and second sleeves, respectively and nearest said one end of the corresponding sleeve.

4. The assembly of claim 3 wherein said spring retainer is made of a somewhat resilient wire.

5. The assembly of claim 1 wherein at least one of said female seats includes an internal, convex, rounded shoulder.

6. The assembly of claim 1 wherein one of said sleeves has a larger internal passage than the other of said sleeves.

7. The assembly of claim 1 wherein said first and second retainers are individual C-shaped retaining rings.

8. The assembly of claim 1 further including spaced male coupling mounting means in said block for mounting respective male couplings in sealed relation to a corresponding one of said female seats.

9. The assembly of claim 8 wherein said male coupling mounting means comprise threaded bores.

10. The assembly of claim 1 wherein said block, on one side thereof, includes a relief adapted to locate said block in an opening.

11. The assembly of claim 10 wherein said relief is a peripheral relief.

12. The assembly of claim 1 wherein said first and second retainers are individual C-shaped retaining rings, said block including a recess about each said aperture on said block one side, said recesses being sized and shaped to receive a corresponding retaining ring and maintain the same in the associated groove.

13. An assembly for use in a brazed or welded heat exchange system comprising:
 a mounting block adapted to connect a heat exchanger into a heat exchange system;
 first and second spaced apertures in said block;
 first and second sleeves each having an outer surface sized to be snuggly, but slidably received in a respective one of said apertures, each outer surface having grooves spaced apart a distance about or slightly greater than the thickness of said mounting block at the corresponding aperture, each sleeve, at one end having an interior sized to receive a tube to be brazed or welded thereto and at the opposite end including a female seat for receipt of a male coupling element, said first and second sleeves being located in said first and second apertures, respectively;
 retainers for each of said sleeves and located in the groove of the associated sleeve nearest said opposite end and abutting one side of said block; and
 retaining means on the other side of said block and abutting the same, said retaining means being located in the grooves of each sleeve nearest said one end;

the mass of said sleeves being small in relation to the mass of said block to facilitate brazing or welding tubes to said sleeves.

14. A fluid coupling assembly including:

a mounting block including a formation by which said block may be mounted on another object such as a support;

at least one aperture extending through said block;

a sleeve having opposed ends and an exterior surface sized to snuggly and slidably pass at least partially through said aperture and an interior surface defining a fluid passage;

a pair of axially spaced grooves in said exterior surface, said grooves being spaced a distance about equal to the thickness of said block at said aperture;

said interior passage, at one of said opposed ends including a seal seat for fluid sealing abutment with a male coupling;

a retaining ring in the groove nearest said one end and butting one side of said block;

retaining means removably received in the groove remote from said one end and abutting the other side of said block; and said block one side including a recess about said aperture having a depth and periphery sized to receive said retaining ring and hold the same in the groove in which it is received.

15. The coupling assembly of claim 14 wherein the interior surface at the other of said opposed ends is cylindrical for receipt of a tube and includes an interior shoulder for limiting the introduction of a tube into said other end.

16. The coupling assembly of claim 14 wherein said retaining means is a resilient element.

* * * * *